(12) United States Patent
Holecek et al.

(10) Patent No.: US 9,987,757 B2
(45) Date of Patent: Jun. 5, 2018

(54) METHOD FOR OPERATING A VACUUM GENERATOR AND A VACUUM GENERATOR

(71) Applicant: J. Schmalz GmbH, Glatten (DE)

(72) Inventors: Thomas Holecek, Freudenstadt (DE); Thomas Eisele, Alpirsbach-Peterzell (DE); Harald Kuolt, Dellingen (DE); Christian Frey, Baiersbronn (DE)

(73) Assignee: J. Schmalz GmbH, Glatten (DE)

( * ) Notice: Subject to any disclaimer, the term of this patent is extended or adjusted under 35 U.S.C. 154(b) by 569 days.

(21) Appl. No.: 14/378,464

(22) PCT Filed: Feb. 11, 2013

(86) PCT No.: PCT/EP2013/052675
§ 371 (c)(1),
(2) Date: Aug. 13, 2014

(87) PCT Pub. No.: WO2013/120801
PCT Pub. Date: Aug. 22, 2013

(65) Prior Publication Data
US 2015/0017025 A1    Jan. 15, 2015

(30) Foreign Application Priority Data
Feb. 13, 2012   (DE) .......................... 10 2012 202 124

(51) Int. Cl.
*F04F 5/20* (2006.01)
*F04F 5/52* (2006.01)
(Continued)

(52) U.S. Cl.
CPC ........... *B25J 19/02* (2013.01); *B25J 15/0616* (2013.01); *B25J 19/06* (2013.01); *B65G 47/91* (2013.01);
(Continued)

(58) Field of Classification Search
CPC ........ F04F 5/14; F04F 5/16; F04F 5/20; F04F 5/48; F04F 5/52; B65G 47/91; B65G 47/917
(Continued)

(56) References Cited

U.S. PATENT DOCUMENTS

| | | | |
|---|---|---|---|
| 4,762,467 A * | 8/1988 | Ackermann | ............. F04F 5/52 417/185 |
| 5,617,338 A | 4/1997 | Sugano et al. | |

(Continued)

FOREIGN PATENT DOCUMENTS

DE      42 29 834 A1    3/1993
DE   10 2004 031 924 A1    1/2006
(Continued)

OTHER PUBLICATIONS

Non-Final Office Action issued by the U.S. Patent Office in U.S. Appl. No. 14/378,500 dated Jul. 18, 2016.
(Continued)

*Primary Examiner* — Peter J Bertheaud
(74) *Attorney, Agent, or Firm* — Howard & Howard Attorneys PLLC (57) ABSTRACT

The present invention is directed toward a method for operating a vacuum generator using pressure fluid to generate the vacuum. The vacuum generator has a pressure port for pressure fluid supply, and a suction point. During a work cycle, the pressure fluid supply is activated at least once and then deactivated again at least once. An active period is measured during which the pressure fluid supply is activated during the work cycle.

12 Claims, 2 Drawing Sheets

(51) Int. Cl.
   *B65G 47/91*    (2006.01)
   *B25J 19/02*    (2006.01)
   *B25J 15/06*    (2006.01)
   *B25J 19/06*    (2006.01)

(52) U.S. Cl.
   CPC .............. *B65G 47/917* (2013.01); *F04F 5/20* (2013.01); *F04F 5/52* (2013.01)

(58) Field of Classification Search
   USPC ........................................ 417/182, 187, 189
   See application file for complete search history.

(56) References Cited

U.S. PATENT DOCUMENTS

| | | | | |
|---|---|---|---|---|
| 7,140,389 | B2* | 11/2006 | Schnatterer | F04F 5/20 137/565.23 |
| 7,263,890 | B2* | 9/2007 | Takahashi | B25J 15/0616 29/740 |
| 8,678,776 | B2* | 3/2014 | Medow | F04F 5/52 417/151 |
| 9,175,688 | B2* | 11/2015 | Neel | F04C 23/005 |
| 2010/0303641 | A1* | 12/2010 | Medow | F04F 5/52 417/188 |
| 2015/0052990 | A1 | 2/2015 | Dunkmann et al. | |

FOREIGN PATENT DOCUMENTS

| | | |
|---|---|---|
| DE | 10 2007 058 114 A1 | 6/2009 |
| DE | 10 2007 061 820 A1 | 6/2009 |
| EP | 2 080 913 A1 | 7/2009 |
| JP | H05069997 A | 3/1993 |
| KR | 20100096118 A | 9/2010 |

OTHER PUBLICATIONS

Apr. 23, 2013 International Search Report for Application No. PCT/EP2013/052675.
Aug. 13, 2014 Written Opinion for Application No. PCT/EP2013/052675.
Nov. 6, 2013 International Preliminary Report on Patentability for Application No. PCT/EP2013/052675.
Opposition Communication mailed by the European Patent Office dated Apr. 20, 2017 in European Patent Application No. 13704086.1 and machine-generated translation obtained from the Google Translate website.
Final Office Action issued for corresponding U.S. Appl. No. 14/378,500 dated Feb. 10, 2017.
Notice to Submit Response issued by the Korean Intellectual Property Office dated Mar. 12, 2018 in Korean Patent Application No. 10-2014-7025414.

* cited by examiner

METHOD FOR OPERATING A VACUUM GENERATOR AND A VACUUM GENERATOR

CROSS-REFERENCE TO RELATED APPLICATIONS

This application is based upon and claims priority to PCT Application No. PCT/EP2013/052675 filed on Feb. 11, 2013, which claims priority to German Patent Application No. DE 102012202124.8 filed on Feb. 13, 2012.

BACKGROUND OF THE INVENTION

1. Field of the Invention

The present invention relates, generally, to a vacuum generator and, more specifically, to a method for operating a vacuum generator with pressure fluid for generating vacuum.

2. Description of Related Art

Vacuum generators for operating vacuum handling devices such as gripping or clamping devices are known, for example so-called ejectors that are operated with compressed air and provide a vacuum in a suction point on the basis of a supply of compressed air. Vacuum can be generated with ejectors from a stream of compressed air, such as with a Venturi nozzle. In the following context, a pressure appearing in the suction point below ambient pressure will be referred to as vacuum. In operating the vacuum generator, it is known to supply compressed air non-continuously, deactivating the supply during particular time periods. Moreover, it is known to monitor the vacuum generated in the suction point and to employ it for control of the vacuum generator. The supply of compressed air for generating vacuum can then be activated and deactivated in dependency on the vacuum prevailing in the suction point. This makes it possible to reduce the compressed air consumption of the vacuum generator in operation with the vacuum handling device by deactivating the supply of compressed air when the vacuum reaches a hold value in the suction point. Activation can then take place again when the vacuum in the suction point has risen to a standard value (for example due to leakage).

It is desirable to monitor the energy consumption when operating vacuum generator, as low energy efficiency leads to undesired costs. Moreover, utilization of additional measuring equipment in the vacuum system can lead to leakage or susceptibility to errors. Thus, there remains a need in the art for reliable monitoring of the energy efficiency for vacuum generators.

SUMMARY OF THE INVENTION

The present invention overcomes the disadvantages in the prior art in a method for operating a vacuum generator using pressure fluid to generate the vacuum. The vacuum generator has a pressure port for pressure fluid supply, and a suction point. During a work cycle, the pressure fluid supply is activated at least once and then deactivated again at least once. An active period is measured during which the pressure fluid supply is activated during the work cycle.

In addition, the present invention is directed toward a vacuum generator for carrying out the method described above. The vacuum generator has a pressure port for pressure fluid supply, and a suction point. A control device is provided such that the pressure fluid supply to the pressure port can be activated and deactivated. Further, a time measurement device is provided such that an active period can be measured during which the pressure fluid supply is activated in the operation of the device.

The invention relates to vacuum suppliers which generate a suction action using pressure fluid, which is for example provided by a pressure fluid supply device. Such vacuum generators usually have a pressure port for pressure fluid supply and a suction point for vacuum supply of a vacuum handling device. Typically, an outlet is also provided through which pressure fluid, as well as fluid or air suctioned through the suction point, can be conducted away.

A work cycle is used to carry out the operation of the vacuum generator, wherein during the work cycle the pressure fluid supply is activated at least once, i.e. the supply of pressure fluid to the vacuum generator is released and the pressure fluid supply thereafter is deactivated again at least once, i.e. is prevented. In accordance with the invention, an active period is measured in the work cycle during which the pressure fluid supply is activated during the work cycle.

The invention is based on the concept of determining the time period in a work cycle during which pressure fluid for the generation of a suction action is supplied to the vacuum generator. During this time period, the vacuum generator removes, for example, energy from a pressure fluid supply device that provides the pressure fluid. This makes it possible to determine information about the energy consumption in the operation of the vacuum generator. As will be explained in greater detail below, for example, a worsening of the system can be detected and/or the energy consumption can be determined, such as by pressure data for example. The active period can be a continuous time interval between a switch-on time and a switch-off time of the pressure fluid supply. However, it is also conceivable that the active period in a work cycle includes several contiguous active period segments which are interrupted by time periods with deactivated compressed air supply. The measurement of the period takes place with a time measurement device, which is preferably integrated in the vacuum generator itself. However, an external monitoring is also conceivable.

On the basis of an early detection of a worsening of the energy efficiency, maintenance or repair work can be undertaken in time or as a preventive measure. In this way, undesirable failures and increased costs due to low energy efficiency can be prevented. The determination of the energy efficiency during the active period makes it possible to do without additional sensors, such as volumetric flow meters. However, additional sensors can be practical for further development. Regardless, a system with low susceptibility to faults can be provided.

The inventive method is used to operate vacuum generators driven by pressure fluid supply. In operation, the pressure fluid supply can be activated and deactivated. In the activated state of the pressure fluid supply, there is suction through the suction point and, thus, if necessary, a vacuum pressure is generated In operation, pressure fluid flows through the pressure port to the vacuum generator. In the deactivated state, the flow of pressure fluid is prevented. However, in this connection, pressure fluid continues to be present with a static pressure in the pressure port. For example, the pressure generator can have a supply valve assigned to the pressure port such that a flow of pressure fluid through the pressure port can be prevented and released.

Work cycles are performed during operation of the vacuum generator. In a work cycle, the pressure fluid supply is activated for at least one switch-on time and is deactivated for at least one switch-off time. The beginning of the work cycle is, for example, defined as a first switch-on time of the pressure fluid supply, after which, and if necessary, the pressure fluid supply is deactivated again at least once and subsequently activated again. The end of the work cycle is then defined by the last switch-off time of the pressure fluid supply. In the operation of the vacuum generator with a vacuum handling device for the handling of a workpiece (for example, a vacuum gripping device, or a vacuum clamping device), the work cycle can be defined in that the beginning of the work cycle is defined by the first switch-on time of the pressure fluid supply, beginning at which a handling process (for example, gripping or clamping) of the workpiece begins. For example, the time of the beginning of the suctioning of a workpiece to a handling device. Similarly, the end of the work cycle would be defined by the last switch-off time of the pressure fluid supply at which the handling operation of the workpiece is ended. Between the first switch-on time and the last switch-off time, the pressure fluid supply can be deactivated and activated again at least once.

A work cycle for the operation of a vacuum generator for a handling system typically includes the following consecutive operations: In a first operation, the activation of the pressure fluid supply for the generation of a vacuum takes place, for example, to begin with the suctioning of a workpiece to a vacuum handling device. Through the suctioning, the vacuum in the suction point drops proceeding from the ambient pressure to a hold value H1. The hold value H1 is, for example, selected in such a way that a secure handling of the workpiece is possible. If necessary, in a second operation the pressure fluid supply for generating a vacuum can be controlled such that the pressure prevailing in the suction point lies between the hold value (H1) and a control hold value (H1+h1), as explained in greater detail further below (wherein h1 corresponds to a positive offset pressure above the hold value H1 lying below the ambient pressure). Finally, the work cycle typically includes a further operation (third operation), in which the vacuum prevailing in the suction point rises at least to the ambient pressure in order to release the workpiece. In order to ensure a release of the workpiece from a vacuum handling device the pressure in the suction point can increase to a blow-off pressure (blowing off the workpiece) beyond the ambient pressure.

Advantageously, the prevailing supply pressure of the pressure fluid in the pressure port is measured during the work cycle. In particular, a measurement of the total pressure takes place, the total pressure including the static and the dynamic pressure of the pressure fluid. By using known flow parameters reflecting the flow properties of the vacuum generator, it is possible to determine the volumes of pressure fluid supplied to the vacuum generator and/or the energy supplied to the vacuum generator with the pressure fluid from the measured active period and the measured supply pressure. The flow parameters can, for example, be stored in a characteristic or a data field which reproduces a relationship between the supply pressure in the pressure port, the active period, and the volume of pressure fluid flowing through the pressure port. It is also conceivable to take as a basis a known dependency of the volume flow in pressure fluid through the pressure port on the supply pressure prevailing in the pressure port.

The present invention enables several successive work cycles to be performed, wherein the active period is measured in each of the work cycles or in a selection of successive work cycles and corresponding data is saved in a storage device. This makes it possible to determine a development or trend of the active time and/or information derived from this (pressure fluid consumption, energy consumption, etc.) in dependency on the successive work cycles.

The development of the supplied volume of pressure fluid and/or of the supplied energy can, for example, be represented by a display device. By way of example, trend information about the supplied volume of pressure fluid and/or the energy supplied to the vacuum generator from pressure fluid can be determined from the stored data, the trend information representing the development of the respective quantity in dependency on the successive work cycles. The trend information can be calculated from the stored data, for example in a control device of the vacuum generator. The trend information can, for example, contain a positive value for an increasing consumption and a negative value for a decreasing consumption. The trend information can be represented via a display device and/or transmitted via a communication interface of the vacuum generator, for example to an external control device.

In one embodiment, a cycle period is measured for a work cycle, the cycle period via which the work cycle is performed. The cycle period in this respect reflects the period required for a work cycle. In conjunction with the determined active period in a work cycle, in this way a statement is made possible about which proportion of the period of a work cycle the vacuum generator records. Even without pressure measurement and/or volume flow measurement, information can be determined from this about the energy efficiency of the total system.

An active period ratio for the work cycle can be calculated from the active period and the cycle period, for example as a quotient of active period and cycle period. A value reflecting the active period ratio can be assigned to the respective work cycle and stored in a memory device. The determination of the active period ratio allows a convenient software processing and makes possible the comparison of different work cycles with one another. Further, the representation of the obtained information can be simplified by the formation of ratios.

Several succeeding work cycles can be carried out and data about the active period and the cycle period for the respective work cycle can be stored in a memory device. In turn, trend information for the active period and/or the cycle period and or the active period ratio can be determined or calculated from the stored data. The work cycles used for determining the information can be consecutive. However, other work cycles can also be carried out between the work cycles used for determining the information.

For further design, a display of the information determined with the active period can take place during the work cycle or work cycles or also continuously. The information determined with the active period can, for example, relate to the volume of pressure fluid supplied in the work cycle and/or the supplied energy and/or the active period ratio. The representation of trend information about the supplied volume of pressure fluid and/or about the supplied energy and/or about the active period ratio is also conceivable.

It is advantageous to activate and deactivate the pressure fluid supply in dependency on the vacuum generated in the suction point. To this end, preferably during the work cycle the prevailing suction side pressure in the suction point is measured and the pressure fluid supply is activated or deactivated in dependency on the measured suction side pressure. This takes place in such a way that the pressure fluid supply for vacuum generation is deactivated when the suction side pressure has fallen to a hold value (H1) below the ambient pressure or falls below the hold value. The pressure fluid supply will be activated again, for example when after deactivation the suction side pressure has increased again to a control hold value (H1+h1) (wherein h1 corresponds to a positive offset pressure above the hold value H1).

As noted above, disadvantages in the prior art are also overcome with a vacuum generator designed for carrying out the foregoing described method. The vacuum generator has a pressure port for pressure fluid supply and a suction point for vacuum supply of a vacuum generator, as well as if necessary an outlet. Further, a control device is provided such that the pressure fluid supply to the pressure port can be activated and deactivated. The vacuum generator also includes a vacuum pressure unit which can be supplied with pressure fluid via the pressure port and as a result provides a suction action in the suction point (for example, a Venturi nozzle).

In accordance with the invention, a time measurement device is provided such that an active period can be measured, the time measurement device via which in operation of the device the pressure fluid supply is activated during a work cycle. The pressure fluid supply can, for example, be activated and deactivated as a result of the fact that the vacuum generator has a supply valve with which a supply of pressure fluid through the pressure port can be prevented and released. The supply valve is preferably controlled by the control device for activation and deactivation of the pressure fluid supply. The time measurement device can be constructed integrated in the control device. Preferably the control device, the time measurement device and, if necessary, the supply valve are arranged in a common housing of the vacuum generator.

In addition, a supply pressure sensor can be provided, with which the prevailing supply pressure of the pressure fluid in the pressure port can be measured. In particular, the vacuum generator itself can have the supply pressure sensor. The supply pressure sensor can, for example, be integrated in the housing of the vacuum generator. However, an external measurement of the supply pressure is also conceivable, wherein the measured values of the vacuum generator can be supplied. To this end these can have a corresponding communication interface.

In one embodiment, a suction pressure sensor is provided, with which the prevailing suction side pressure in the suction point can be measured. The suction pressure sensor preferably cooperates with the control device in such a way that the control device activates and deactivates the pressure fluid supply in dependency of the suction side pressure.

In order to visualize the information that can be determined for the purpose of the inventive method, the vacuum generator can have a display device. As explained, the information that can be determined includes the supplied volume of pressure fluid in a work cycle and/or the energy supplied via pressure fluid and/or an active period ratio and/or trend information about the supplied volume or the supplied energy or the active period ratio.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
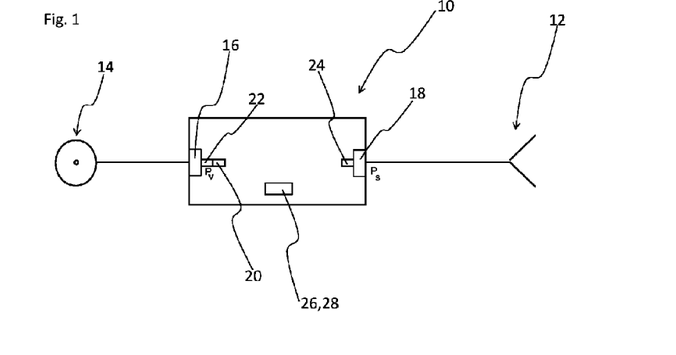
FIG. 1 shows a representation of a vacuum generator for carrying out the inventive method.

Referring now to the drawings, where the same reference numbers are used for identical or corresponding features, FIG. 1 shows a vacuum generator 10, with which a vacuum supply for a sketched indicated vacuum generator 12 (for example, a suction gripper) can be provided. Further, a pressure fluid supply device 14 is shown, with which pressure fluid can be provided for supply of the vacuum generator 10.

The vacuum generator 10 has a pressure port 16 and a suction point 18. Further, an outlet (not shown in detail, but generally known in the art) for conducting away pressure fluid and/or suctioned fluid may be provided. The pressure port 16 is pressure connected to the pressure fluid supply device 14. The vacuum handling device 12 is connected to the suction point 18. The vacuum generator 10 also includes a vacuum generation device (not shown in detail, but generally known in the art) configured to generate a suction action in the suction point 18 in the event of the supply of a volume flow of pressure fluid through the pressure port 16 (for example, a Venturi nozzle).

The vacuum generator 10 has a supply valve 20, with which a supply of pressure fluid through the pressure port 16 can be prevented and released, so that a suctioning through the suction point 18 can be deactivated and activated. In this respect, the pressure fluid supply for the generation of a vacuum can be activated and deactivated with the supply valve 20.

A supply pressure sensor 22 can be arranged in the vacuum generator 10 such that the prevailing supply pressure $p_V$ of the pressure fluid in the pressure port 16 can be measured. The supply pressure sensor 22 can however also be arranged outside of the vacuum generator 10, for example in a supply line of the pressure fluid supply device 14 to the vacuum generator 10. Furthermore, a suction pressure sensor 24 is provided, with which the prevailing suction side pressure $p_S$ in the suction point 18 can be measured. The suction pressure sensor 24 is not absolutely necessary; however, it does make possible the control of the vacuum generator 10 in advantageous manner.

The vacuum generator 10 further includes a control device 26, with which the supply valve 20 can be controlled for activation and deactivation of the pressure fluid supply. Preferably, the control device 2 is designed such that the pressure fluid supply can be controlled in dependency on the suction side pressure $p_S$ measured with the suction pressure sensor 24, as will be described in greater detail below.

In addition, a time measurement device 28 is provided, with which the pressure fluid supply to the vacuum generator 10 is activated, i.e. via which the supply valve 20 is in a position in which the supply of pressure fluid to the vacuum generator 10 is released for the generation of a suction action. This period of time, referred to in the following as an active period, does not have to be contiguous, but rather can be made up of several periods of time which are interrupted by times in which the pressure fluid supply is deactivated, i.e. with the supply valve 20 a pressure fluid supply is prevented.

In the operation of the vacuum generator 10 with the vacuum handling device 12, successive work cycles are carried out. Different work cycles will be described in the following with reference to FIGS. 2 and 3. In the presented diagrams, on the ordinate above a prevailing vacuum in the suction point 18 is applied below the ambient pressure $p_0$. Positive Y values (ordinates) correspond to a pressure falling below the ambient pressure $p_0$ in the suction point 18, in the following called suction side pressure $p_S$. The abscissa (X-axis) depicts the time curve. In each case, a work cycle is represented wherein the suction side pressure $p_S$ proceeding from the ambient pressure $p_0$ of the vacuum handling device 12 is lowered (i.e. a vacuum with a positive value appears on the Y-axis) and after a time variation returns to the ambient pressure $p_0$ again.

Figure 2:
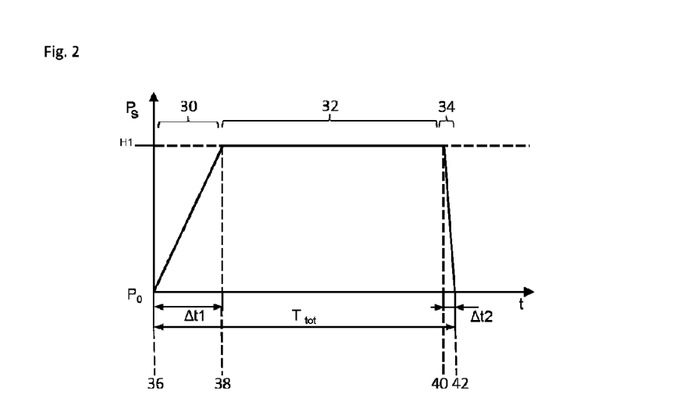
FIG. 2 shows a schematic representation of the pressure in the suction point in dependency on the time for a work cycle for the explanation of a first inventive method.

FIG. 2 shows the time curve of the suction side pressure $p_S$ in a work cycle in which case by holding a workpiece on the vacuum handling device 12 a flow of suctioned air through the suction point 18 is completely prevented. This can be the case, for example with a workpiece tightly joined to a suction gripper.

The represented work cycle is divided in its time curve (along the time axis) into three sequential operations 30, 32, and 34. In the first operation 30, an activation of the pressure fluid supply occurs at a first switch-on point 36. As a result, a suctioning through the suction point 18 of the vacuum generator 10 begins. Through the suction action the suction side pressure $p_S$ that can be measured with the suction pressure sensor 24 in the suction point 18 drops, i.e. in the representation of FIG. 2 an increasing vacuum can be detected. At a time 38 the suction side pressure $p_S$ has reached a hold value H1. The value is selected such that a secure handling of a workpiece with the vacuum handling device 12 is possible.

The control device 26 of the vacuum generator 10 controls the supply valve 20 such that the pressure fluid supply is deactivated when the suction side pressure $p_S$ has dropped to the hold value H1 or has fallen below the hold value. Consequently, in the presented example the pressure fluid supply is deactivated at the so-called switch-off time 38.

With the time measurement device 28 of the vacuum generator 10, a time Δt1 can be measured over which pressure fluid is supplied to the vacuum generator in order to provide a suction action in the first operation and to have the suction side pressure $p_S$ drop proceeding from the ambient pressure after the switch-on point 36 to the hold value H1. In the control device 26, data can then be stored for the work cycle that represents the time Δt1.

In the idealized case assumed for FIG. 2, the suction point 18 of the vacuum generator 10 is tightly sealed after reaching the hold point H1 via the vacuum handling device 12 and the workpiece held with it, so that no further suctioning is necessary to maintain the vacuum in the suction point 18. Thus, in this case after switching off the pressure fluid supply at the first switch-off time 38 the pressure fluid supply remains deactivated during the second operation 32. The second operation 32 is terminated due to the fact that the pressure fluid supply at a second switch-on point 40 is activated again and in the represented example, as a result the third operation 34 begins. For example, this serves the purpose of reducing the vacuum provided in the suction point 18 and thus for the vacuum handling device 12 in order, for example to release a held workpiece. This can happen, for example by activating the pressure fluid supply, wherein the pressure port 16 is connected to the suction point 18 via a blow-off valve (not shown in detail, but generally known in the art) such that the suction point 18 remains ventilated. In the third operation 34 the suction side pressure $p_S$ increases again to the ambient pressure $p_0$. It is also conceivable that the suction side pressure $p_S$ rises briefly above the ambient pressure $p_0$ in the third operation 34 in order to ensure a blowing off of a workpiece held with the vacuum handling device 12. At the end of the represented work cycle, the pressure fluid supply is again deactivated at a second switch-off time 42.

With the time measuring device 28 of the vacuum generator 10, a further active period active time segment Δt2 can be measured between the second switch-on time 40 and the second switch-off time 42. In the control device 26, for example, data can be stored that corresponds to the length of the second active time segment Δt2 for a work cycle. In this way, an active period $T_A$ can be determined during which the pressure fluid supply is activated during the work cycle. The total active period $T_A$ corresponds to the sum of the individual active time segments, in the presented example $T_A=\Delta t1+\Delta t2$.

With the time measurement device 28 preferably also the total cycle period $T_{tot}$ can be measured, which in the presented example is defined between the first switch-on time 36 and the second switch-off time 42. A quotient can be formed from the active period $T_A$ and the cycle period $T_{tot}$, the quotient reflecting the active period ratio of the work cycle. The active period ratio is a measurement of the energy efficiency of the work cycle. It is also conceivable that during the work cycle the prevailing supply pressure $p_V$ in the pressure port 16 is measured with the supply pressure sensor 22. During the active period $T_A$ the pressure fluid supply is activated and, thus, pressure fluid flows from the pressure fluid supply device 14 under a total pressure corresponding to the supply pressure $p_V$ through the pressure port 16. By using flow parameters of the vacuum generator 10, the volume of pressure fluid supplied to the vacuum generator 10 in the work cycle can be calculated from the active period $T_A$ and the supply pressure $p_V$. The flow parameters can, for example include a flow resistance of the overall arrangement of the vacuum generator together with flow-efficient components, such as for example a supply valve 20. The parameters can be stored in the control device 26. Then, the energy intake of the vacuum generator 10 of the vacuum supply device 14 in the work cycle can be calculated from the volume of pressure fluid supplied in a work cycle.

Figure 3:
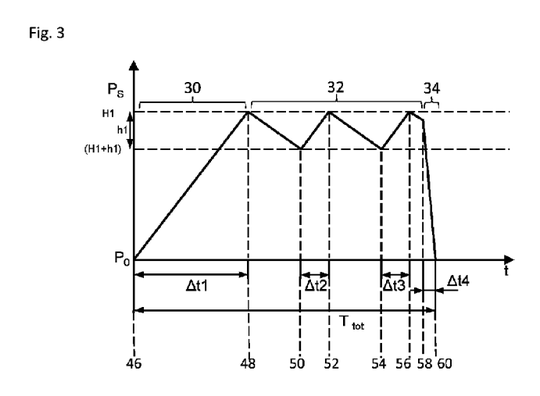
FIG. 3 shows a schematic representation of the pressure in the suction point as a function of the time for a work cycle for the explanation of a further inventive method.

FIG. 3 shows the time curve of the suction side pressure $p_S$ during a work cycle wherein no complete seal of the suction point 18 is achieved. The represented work cycle is in turn divided along the time axis into successive operations 30, 32, 34. The first operation 30 begins with the first switch-on point 46, at which the pressure fluid supply is activated and as a consequence the suction side pressure $p_S$ falls below the ambient pressure $p_0$. As soon as a hold value H1 is reached, a secure handling of a workpiece with the vacuum handling device 12 can be assumed. The first operation 30 is followed by the second operation 32, in which the suction side pressure $p_S$ is regulated between the hold value H1 and a control hold value H1+h1. In this connection, the quantity h1 represents a positive offset pressure above the hold value H1. The control hold value H1+h1 is also preferably selected such that a secure handling of a workpiece is still ensured. After deactivation of the pressure fluid supply in the first switch-off time 48, the suction side pressure $p_S$ in the suction point 18 rises again, for example due to leakage in the vacuum handling device 12 with the held workpiece. As soon as the suction side pressure $p_S$ proceeding from the hold value H1 has risen to the control hold value H1+h1, the pressure fluid supply is activated again at a second switch-on time 50. For example, the control device 26 can be designed such that the supply valve 20 releases the pressure fluid supply when in the second operation 32 the suction side pressure $p_S$, proceeding from the hold value H1, rises above the control hold value H1+h1. After activation of the pressure fluid supply in the second switch-on time 50, the suction side pressure $p_S$ drops again due to the suctioning through the suction point 18, and is preferably deactivated in turn upon reaching the hold value H1 at a second switch-off time 52.

In the case of a deactivated pressure fluid supply, the suction side pressure $p_S$ rises again and, if necessary, exceeds the control hold value H1+h1. Due to the control of the vacuum generator 10, then in a third switch-on time 54 the pressure fluid supply is again activated and deactivated at a third switch-off time 46, in which the suction side pressure $p_S$ has again reached the hold value H1. To end the work cycle, as previously explained in connection with FIG. 2, the suction side pressure $p_S$ can increase to or above the ambient pressure $p_0$, in order, for example to ensure a removal of a workpiece. To this end, starting with a fourth switch-on time 58, the pressure fluid supply is again activated. The work cycle ends with deactivation of the pressure fluid supply at a last switch-off point 60.

With the time measurement device 28, the periods of those time segments in which the pressure fluid supply is activated are measured, thus $\Delta t1$ between the first switch-on time 46 and the first switch-off time 48, $\Delta t2$ between the second switch-on time 50 and the second switch-off time 52, $\Delta t3$ between the third switch-on time 54 and the third switch-off time 56 as well as $\Delta t4$ between the last switch-on time 58 and the last switch-off time 60 to end the work cycle. The total active time in the work cycle arises in turn as the sum of all active time segments, $T_A = \Delta t1 + \Delta t2 + \Delta t3 + \Delta t4$.

The time measurement device 28 preferably cooperates with the control device 26 such that, after determination of an active time segment during which the pressure fluid supply is activated in a work cycle, a value representing the active time segment is stored in the control device 26. Furthermore, preferably at the end of a work cycle the values stored in the control device 26 for the active time segments can be added in order to obtain the total active period $T_A$ for the work cycle.

As noted above with regard to FIG. 2, the cycle period $T_{tot}$ can also be measured with the time measurement device 28. The active period ratio $T_A/T_{tot}$ reflects a measurement of the energy efficiency in the work cycle. Likewise, with the help of flow parameters the consumption of pressure fluid and/or energy consumption of the vacuum generator 10 can be determined from the prevailing supply pressure $p_V$ in the pressure port 16 and the active period $T_A$.

In using the vacuum generator 10 in accordance with the presented method with a vacuum handling device 12, a plurality of work cycles are typically performed in succession. For further design, data about the active periods assigned to the work cycles or the information determined from the data can be stored in the control device 26. Through evaluation of the active periods assigned to different succeeding work cycles or the information obtained from the active periods, trend information can be derived which for example can indicate a worsening of the energy efficiency of the vacuum generator of the system of vacuum generator and vacuum handling device.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for operating a vacuum generator using pressurized fluid to generate vacuum and a pressure pressurized fluid supply for supplying pressurized fluid, wherein the vacuum generator comprises a port, to which the pressurized fluid is supplied for generating a suction effect, and further comprising a suction point, at which suction is provided, said method comprising the steps of:
   performing a work cycle in the operation of the vacuum generator, wherein during the work cycle the supply of pressurized fluid to the pressure port is activated at least once, then deactivated and then activated again at least once,
   wherein the work cycle comprises three consecutive operations including a first operation in which the pressure prevailing at the suction point drops to a hold value (H1), a second operation in which the supply of pressurized fluid is controlled such that the pressure prevailing at the suction point is maintained between the hold value (H1) and a control hold value (H1+h1), and a third operation in which the pressure prevailing at the suction point rises at least to ambient pressure,
   measuring an active period of the work cycle, wherein the active period is the total period of time during which pressurized fluid is supplied to the vacuum generator and flows through the pressure port of the vacuum generator for generating a suction effect,
   determining the efficiency of the work cycle based on the measured active period,
   and measuring the prevailing supply pressure of the pressurized fluid in the pressure port during the work cycle.

2. The method as set forth in claim 1, further including the steps of determining the volumes of pressurized fluid supplied to the vacuum generator and/or energy supplied to the vacuum generator from the active period, from the measured supply pressure, and from known flow parameters of the vacuum generator.

3. The method as set forth in claim 2, further including the steps of performing a plurality of successive work cycles and saving the data representing the supplied volume of pressurized fluid and/or the energy supplied to the vacuum generator via pressurized fluid in a storage device.

4. The method as set forth in claim 3, further including the step of determining the trend information representing the supplied volume of pressurized fluid and/or the energy supplied to the vacuum generator from the stored data.

5. The method as set forth in claim 1, wherein the step of determining the efficiency of the work cycle further includes measuring a cycle period for the work cycle via which the work cycle is performed.

6. The method as set forth in claim 5, wherein the step of determining the efficiency of the work cycle further includes calculating an active period ratio for the work cycle from the active period and the cycle period.

7. The method as set forth in claim 6, wherein a plurality of succeeding work cycles are carried out and data representing the active period and the cycle period for the respective work cycle is stored in a memory device.

8. The method as set forth in claim 2, further including the steps of displaying the information determined with the active period, including the volume of pressurized fluid supplied in the work cycle and/or the supplied energy and/or an active period ratio and/or trend information representing supplied volume of pressurized fluid and/or energy supplied to the vacuum generator and/or trend information of an active period ratio for the work cycle.

9. The method as set forth in claim 1, wherein during the work cycle a prevailing suction side pressure in the suction point is measured and the supply of pressurized fluid is activated or deactivated in dependency on the measured suction side pressure.

10. A vacuum generator for carrying out the method as set forth in claim 1, said vacuum generator including the pressure port for pressurized fluid supply and the suction point, wherein a control device is provided such that the supply of pressurized fluid to the pressure port for carrying out the work cycle can be activated and deactivated, and wherein a time measurement device is provided such that during the work cycle the active period can be measured, and wherein a supply pressure sensor is provided for measuring the prevailing supply pressure of the pressurized fluid in the pressure port during the work cycle.

11. The vacuum generator as set forth in claim 10, wherein a suction pressure sensor is provided for measuring the prevailing suction side pressure in the suction point.

12. The vacuum generator as set forth in claim 10, further including a display device for displaying information determined using the active period, said information including the supplied volume of pressurized fluid and/or the energy supplied via pressurized fluid and/or an active period ratio and/or trend information of the supplied volume of pressurized fluid and/or the energy supplied to the vacuum generator via pressurized fluid and/or trend information of the active period ratio for the work cycle.

* * * * *

UNITED STATES PATENT AND TRADEMARK OFFICE
CERTIFICATE OF CORRECTION

PATENT NO. : 9,987,757 B2
APPLICATION NO. : 14/378464
DATED : June 5, 2018
INVENTOR(S) : Thomas Holecek et al.

It is certified that error appears in the above-identified patent and that said Letters Patent is hereby corrected as shown below:

On the Title Page

Item (72) Inventors: delete "Dellingen" and insert therefor --Deilingen--.

Signed and Sealed this
Ninth Day of October, 2018

Andrei Iancu
*Director of the United States Patent and Trademark Office*